March 16, 1965

R. A. POTRUCH 3,173,987

TERMINAL BOX WITH YOKE AND CLIP
SUPPORTING MEANS FOR CABLES
Filed March 4, 1963

INVENTOR.
ROBERT A POTRUCH
BY
Salvatore G. Militana,
attorney

United States Patent Office 3,173,987
Patented Mar. 16, 1965

3,173,987

TERMINAL BOX WITH YOKE AND CLIP SUPPORTING MEANS FOR CABLES

Robert A. Potruch, Miami Beach, Fla., assignor to Lumidor Products Corporation, Hialeah, Fla., a corporation of Maryland Filed Mar. 4, 1963, Ser. No. 262,639
5 Claims. (Cl. 174—52)

This invention relates to junction boxes and is more particularly directed to a telephone terminal box.

A principal object of the present invention is to provide a terminal box through which a plurality of power or telephone lines extend with means for readily connecting certain of those lines with other power and telephone lines.

Another object of the present invention is to provide a terminal box with a cable yoke for supporting a plurality of power or telephone lines that extend through the terminal box thereby rendering the lines accessible for connecting to another telephone line extending to an exterior installation.

A further object of the present invention is to provide a terminal box with terminal snap on clamps which are readily placed therein for selectively supporting and separating certain telephone lines from the remaining lines.

A further object of the present invention is to provide a terminal box for telephone and power lines with a cable yoke and snap on terminal clamps for maintaining the lines accessible to readily connect same to other similar lines.

A still further object of the present invention is to provide a terminal box which eliminates the need for lashing or binding power and telephone lines together and maintains the lines in an orderly and accessible fashion.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figures 1, 2, 3, 4, 5, 6:
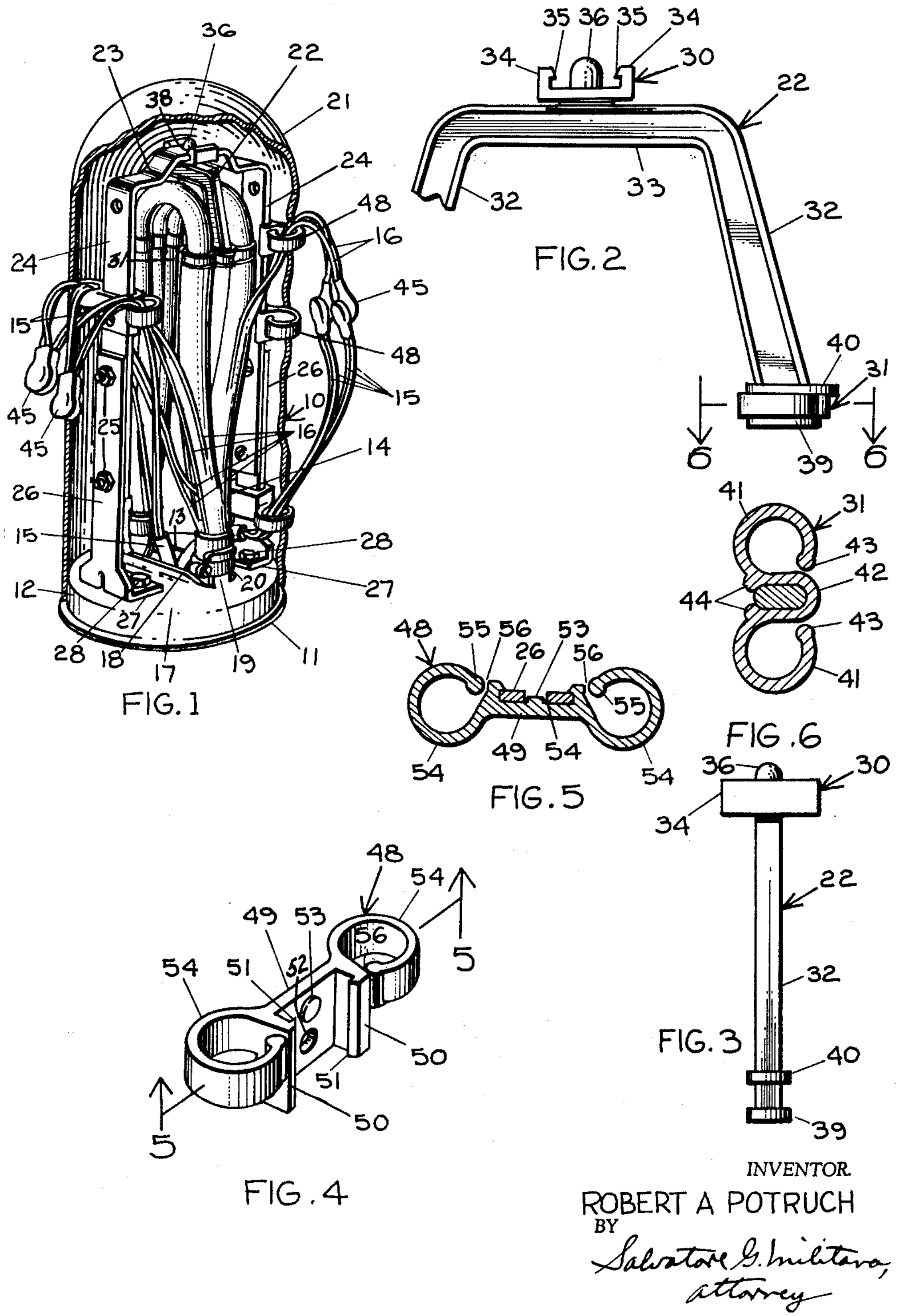
FIGURE 1 is a perspective view of a terminal box constructed in accordance with my invention and shown with its cover broken away.
FIGURE 2 is a fragmentary side elevational view of my yoke shown removed from its position in the terminal box.
FIGURE 3 is a side elevational view of the yoke shown with the hanger removed.
FIGURE 4 is a perspective view of my snap on clamp shown prior to mounting in the terminal box.
FIGURE 5 is a cross sectional view of the snap on clamp taken along 5—5 of FIGURE 4 as it would appear mounted on its support.
FIGURE 6 is a cross sectional view taken along the line 6—6 of FIGURE 2.

Referring to the drawing wherein like numerals are used to designate similar parts throughout the several views, the numeral 10 refers to a terminal box embodying my invention and shown with its dome-like cover 21 partially broken away. The terminal box 10 consists of a base member 11 having a ledge portion 12 on which the cover 21 engages. The base member 11 is provided with an elongated opening 13 through which all power or telephone lines 14 and 15 extend to be received into the terminal box 10. The coil or group of lines 14 extend to and from a power source such as the telephone exchange while the lines 15 extend to a telephone installation. The lines 15 are connected by means of a solderless connector 45 to a pair of lines which have been removed from the coil of lines 14 and cut in two as explained in detail hereinafter.

The opening 13 which is formed by cutting slots in the bottom wall 17 of the base member 11 and bending the wall upwardly to form upstanding side walls 18 and end wall 19. To each of the end walls 19 there is secured a clamp 20 which encircles the coil of lines 14 to fasten the lines 14 to the terminal box 10, the mid-portion of the coil of lines 14 extending to the upper portion of the terminal box 10 and supported by a yoke 22. The yoke 22 is suspended on a bridge 23 which is provided with leg portion 24 that are fastened as by bolts 25 to upstanding supports 26. The supports 26 of which there are a pair, are provided with a foot portion 27 that rests on the bottom wall 17 of the base member 11 and fastened thereto by bolts 28.

The yoke 22 which is U-shaped consisting of a top member 33 and leg members 32 is provided with a fastening member 30 secured to the top member 33 and snap on hangers 31 at the lower ends of their leg members 32. The fastening member 30 consists of a pair of spaced apart side walls 34 at whose inner wall portion extends a shoulder 35 adjacent the top edge of the side walls 34. A somewhat semi-spherical member 36 extends upwardly at a mid-portion between the side walls 34. The member 36 is received by a bore 38 in the mid-portion of the bridge 23 while the side walls 34 hug the edge portions of the bridge 23 with the shoulders 35 engaging the upper surface of the bridge 23 to secure the yoke 22 to the bridge 23.

To the lower ends of the leg members 32 of the yoke 22 are snap on hangers 31 slidably positioned between an end wall 39 and an upper wall 40. The snap on hangers 31 are approximately identical to those described and claimed in my copending application, Serial Number 203,541, now Patent Number 3,136,515, filed on June 19, 1962, for Hanger for Wires, Cables, and the Like. The hangers 31 are provided with arcuate arm portions 41 which form a circle with a U-shaped body portion 42 terminating in a slotted portion 43 to permit the telephone wires 14 to pass therethrough and be held by the arm portions 41. The U-shaped body portion 42 engages the leg portions 32 of the yoke 22 and is held thereon between the walls 39 and 40 by shoulder members 44 mounted on the U-shaped body portion 42 and engage the leg members 32. The telephone lines forming the coil of wire 14 are divided in two groups and are slid past the slots 43 to be supported in an orderly fashion by the arcuate arm portions 41 of the hangers 31 as best shown by FIGURE 1.

When it is necessary to make a connection of a pair of wires 16 from the coil of wires 14 with a pair of wires 15 which extend to an outside installation, the pair of wires 16 is taken from the coil of wires 14 and severed. Each pair of ends of wires 16 are then inserted into the solderless connections 45 with the wires 15 being inserted into the other end of the solderless connector 45 to effect an electrical connection between the outside installation and the telephone exchange or power source. These wires 16 from the coil 14 that have been connected are separated from the coil 14 by supporting them by snap on clamps 48. Each clamp 48 is capable of supporting a pair of such connected telephone wires 16, 15 and as many clamps 48 are used as are required to maintain the connected wires in an orderly and accessible fashion.

Each snap on clamp 48 which is removably secured to the support members 24, and 26 consists of a flat body portion 49 which extends a distance equal to the width of the support members 24, 26. Wall portions 50 extend at right angle to the body portion to a distance greater than the thickness of the support members 24, 26. Shoulder members 51 which extend inwardly in a direction toward each other at the end of the walls 50 engage the outer edge of the support members 24, 26 to removably fasten the clamp 48 to the support member 24, 26. A bore 52 in the body portion 49 will permit securing the clamp 48 to the support member 26 by means of a screw or bolt. Also, a tit 53 is provided on the inside surface of body portion 49 to be received by a bore 54 on the support member 24, 26 to prevent the clamp 48 from slipping downwardly along the support member 24, 26. At the side edges of the body portion, arcuate arm portions 54 extend and terminate as at 55 in close proximity to the walls 50 forming a slot 56. The connected wires 15, 16 are slipped through the slot 56 to permit the loops 54 to support the wires 15, 16 and connectors 16 in full view and easy access.

Having disclosed my invention, what I claim as new and desire to secure by Letters Patent, of the United States is:

1. A terminal box comprising a base member, a removable cover mounted on said base member forming an enclosed chamber, a pair of upright support members mounted on said base member and extending upwardly in said chamber, a bridge member extending across said upper portion of said chamber and secured to said upright support members, power lines supporting means secured to said bridge means, said bridge member having an opening, and said power lines supporting means comprising a substantially U-shaped member, a pair of upstanding wall portions mounted on a top portion of said U-shaped member, shoulder means mounted on said wall portions for engaging said bridge member, projection means mounted on said U-shaped member between said wall portions and received by said opening in said bridge member for securing said U-shaped member, coil receiving means mounted on leg portions of said U-shaped member, said base member having an opening permitting a coil of power lines to enter and leave said chamber forming an upwardly extending loop supported by said coil receiving means, means securing said power lines to said base member, and removable clamp means mounted on said upright support members for supporting power lines selectively removed from said coil of power lines for connecting to other lines.

2. A terminal box comprising a base member, a removable cover mounted on said base member forming an enclosed chamber, a pair of upright support members mounted on said base member and extending upwardly in said chamber, bridge member extending across said upper portion of said chamber and secured to said upright support members, power lines supporting means secured to said bridge means, said base member having an opening permitting a coil of power lines to enter and leave said chamber forming an upwardly extending loop supported by said power lines supporting means, means securing said power lines to said base member and removable clamp means mounted on said upright support members for supporting power lines selectively removed from said coil of power lines for connecting to other lines, said removable clamp means comprising a base member, a pair of wall portions mounted on edge portions of said base member at substantially right angles thereto, said wall portions being in spaced relation equal to substantially the width of said upright support members, shoulder means mounted on said wall portions engaging said upright support members for securing said clamp means to said upright support members and arcuate arm portions extending outwardly of said base member and terminating in spaced relation to said wall portions for receiving said connected power lines.

3. A terminal box comprising a base member, a removable cover mounted on said base member forming an enclosed chamber, a pair of upright support members mounted on said base member and extending upwardly in said chamber, a bridge member extending across said upper portion of said chamber and secured to said upright support members, power lines supporting means secured to said bridge means, said bridge member having an opening, and said power lines supporting means comprising a substantially U-shaped member, a pair of upstanding wall portions mounted on a top portion of said U-shaped member, shoulder means mounted on said wall portions for engaging said bridge member, projection means mounted on said U-shaped member between said wall portions and received by said opening in said bridge member for securing said U-shaped member, coil receiving means mounted on leg portions of said U-shaped member, said base member having an opening permitting a coil of power lines to enter and leave said chamber forming an upwardly extending loop supported by said coil receiving means, means securing said power lines to said base member, and removable clamp means mounted on said upright support members for supporting power lines selectively removed from said coil of power lines for connecting to other lines, said removable clamp means comprising a base member, a pair of wall portions mounted on edge portions of said base member at substantially right angles thereto, said wall portions being in spaced relation equal to substantially the width of said upright support members, shoulder means mounted on said wall portions engaging said upright support members for securing said clamp means to said upright support members and arcuate arm portions extending outwardly of said base member and terminating in spaced relation to said wall portions for receiving said connected power lines.

4. A yoke for supporting power lines comprising a main body member, leg portions secured to said main body member forming substantially a U-shape, a pair of upstanding wall portions mounted on said main body member in substantially spaced parallel relation, shoulder means mounted on an inside surface of said wall portions, a projection mounted on said main body member between said wall portions, said leg portions terminating in a slotted portion and wire receiving means slidably mounted on said slotted portion for receiving and supporting a plurality of wires.

5. A yoke for supporting power lines comprising a main body member, leg portions secured to said main body member forming substantially a U-shape, a pair of upstanding wall portions mounted on said main body member in substantially spaced parallel relation, shoulder means mounted on an inside surface of said wall portions, a projection mounted on said main body member between said wall portions, said leg portions terminating in a slotted portion and wire receiving means slidably mounted on said slotted portion, said wire receiving means comprising a U-shaped body portion slidably positioned on said slotted portion, holding means mounted on said U-shaped body portion for maintaining said U-shaped body portion on said slotted portion and an arcuate arm portion extending outwardly on each side of said U-shaped body portion and terminating in spaced relation to said U-shaped body portion for receiving said wires.

References Cited by the Examiner

UNITED STATES PATENTS

| | | | |
|---|---|---|---|
| 2,606,734 | 8/52 | Magnuson | 248—301 X |
| 2,916,539 | 12/59 | Hamilton | 174—100 X |

OTHER REFERENCES

Advt.: Utility Buried Cable Terminals, by Utility Products Co., 3111 West Mill Road, Milwaukee 9, Wisconsin.

JOHN F. BURNS, *Primary Examiner.*

JOHN P. WILDMAN, E. JAMES SAX, *Examiners.*